(12) United States Patent
Beyer et al.

(10) Patent No.: US 8,180,802 B2
(45) Date of Patent: May 15, 2012

(54) EXTENSIBLE DECIMAL IDENTIFICATION SYSTEM FOR ORDERED NODES

(75) Inventors: Kevin Scott Beyer, San Jose, CA (US); Robert William Lyle, Morgan Hill, CA (US); Edison Lao Ting, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2189 days.

(21) Appl. No.: 10/605,448

(22) Filed: Sep. 30, 2003

(65) Prior Publication Data
US 2006/0173927 A1 Aug. 3, 2006

(51) Int. Cl.
*G06F 17/30* (2006.01)
(52) U.S. Cl. .................. 707/797; 707/798; 707/802
(58) Field of Classification Search ............. 707/100, 707/1; 705/1
See application file for complete search history.

(56) References Cited

U.S. PATENT DOCUMENTS

| | | | | |
|---|---|---|---|---|
| 5,063,502 A | | 11/1991 | Jordan, Jr. ............... | 395/725 |
| 6,115,716 A | * | 9/2000 | Tikkanen et al. ......... | 707/100 |
| 6,480,857 B1 | * | 11/2002 | Chandler ................... | 707/100 |
| 6,499,032 B1 | * | 12/2002 | Tikkanen et al. ......... | 707/101 |
| 6,505,205 B1 | | 1/2003 | Kothuri et al. ............ | 707/100 |
| 6,505,206 B1 | * | 1/2003 | Tikkanen et al. ......... | 707/101 |
| 6,889,226 B2 | * | 5/2005 | O'Neil et al. ............. | 707/100 |
| 7,016,904 B1 | * | 3/2006 | Grove et al. .............. | 707/100 |
| 7,062,499 B2 | * | 6/2006 | Nehru et al. .............. | 707/101 |
| 2002/0052895 A1 | | 5/2002 | Keating .................... | 707/514 |
| 2003/0110150 A1 | * | 6/2003 | O'Neil et al. ............. | 707/1 |
| 2003/0130981 A1 | * | 7/2003 | Nehru et al. .............. | 707/1 |
| 2004/0068500 A1 | * | 4/2004 | Rizzo et al. ............... | 707/7 |

OTHER PUBLICATIONS

O'Neil, Patrick and Elizabeth O'Neal: "Insert-Friendly SML Node Labels", SIGMOND 2004, Jun. 13-18, 2004, Paris, France (ACM 1-58113-859-Aug. 4, 2006).*
U.S. Appl. No. 10/647,540, filed Jul. 30, 2003, Bordewekar et al.
U.S. Appl. No. 10/629,744, filed Jul. 30, 2003, Bordewekar et al.

* cited by examiner

*Primary Examiner* — John E Breene
*Assistant Examiner* — Dennis Myint
(74) *Attorney, Agent, or Firm* — IP Authority, LLC; Ramraj Soundararajan

(57) ABSTRACT

An extensible identification system for nodes in a hierarchy is described wherein each node is assigned a concatenation of decimal based values. The values assigned uniquely identify the node, provides an order for the node, and identifies its parent, child, and sibling relationships with other nodes Furthermore, the IDs assigned can be encoded to be byte comparable. Furthermore, the ID's assigned to nodes need not be modified when changes (adding/deleting a child node or a subtree of nodes) are made in the hierarchy. Additionally, in the event of such a change, the order and relationships between the parent, child, and sibling nodes are retained.

22 Claims, 9 Drawing Sheets

EXTENSIBLE DECIMAL IDENTIFICATION SYSTEM FOR ORDERED NODES

BACKGROUND OF INVENTION

1. Field of Invention

The present invention relates generally to the field of database management systems. More specifically, the present invention is related to a decimal identification system for ordered nodes.

2. Discussion of Prior Art

A tree structure comprising nodes is a type of data structure in which each element is attached to one or more elements directly beneath it. The connections among elements in a tree structure are called branches. Trees are often called inverted trees because they are normally drawn with the root at the top. Inverted trees are the data structures used to represent hierarchical file structures. In this case, the leaves are files and the other elements above the leaves are directories.

Tree structures have been used in prior art data processing systems to organize data. But, such prior art fails to provide for a node identification system for ordered nodes wherein adding or deleting a child node (or a subtree of nodes) from a hierarchical structure of nodes still maintains the order and relationships between the parent, child, and sibling nodes.

Node identification solutions based upon assigning pre-order traversal and/or postorder traversal numbers can only provide an ordering solution as such solutions cannot be used to identify sibling relationships between nodes.

FIG. 1 illustrates a node identification solution wherein a concatenation of values are assigned. The root node is assigned an ID of 0. The root node's first child is assigned an ID composed of the parent's ID (0) and a 0. The root node's second child is assigned an ID composed of the parent's ID (0) and a 1. This process is repeated until all nodes are assigned IDs. This system establishes a total ordering for the nodes, i.e., 0<0.0<0.0.0<0.0.1<0.0.2<0.0.2.0<0.0.2.1<0.1< . . . 0.2.2. In addition, the system identifies parent, child and sibling relationships. That is, 0.1 is the parent of 0.1.0 and 0.1.1 because 0.1 is the prefix in both children, and that 0.1.0 and 0.1.1 are siblings because they have the same prefix.

The problem with this system, shown in FIG. 1, is that changes to the hierarchy would require the re-numbering of IDs to maintain the order of the nodes. For example, as in FIG. 2a, adding a node B would require the re-numbering of the node with an ID of 0.2.2, and adding a node C would require the re-numbering of nodes with IDs 0.0.0, 0.0.1, and 0.0.2, including re-numbering any children of such nodes. Adding a node A, however, would not require re-numbering because the new node can be assigned an ID of 0.0.2.2.

FIG. 2b illustrates the modified hierarchical structure of nodes after the insertion of node A, B, and C. The filled nodes (0.0.1, 0.0.2, 0.0.3, 0.0.3.0, 0.0.3.1, and 0.2.3) represent nodes whose values have changed due to the insertion of nodes A, B, or C. The double circle nodes (0.0.0, 0.0.3.2, and 0.2.2) represent nodes that are newly inserted. Hence, it can be seen that the insertion of a new node (or, similarly, the deletion of an existing node) causes a change in the ID values associated with other nodes in a hierarchical structure of nodes.

The following references provide a general teaching in ordering nodes, but they fail to provide for a solution wherein existing ID values can remain the same even after changes (such as insertion or deletion of nodes) are made in a hierarchical structure of nodes.

The patent to Jordan, Jr. (U.S. Pat. No. 5,063,502) provides for an apparatus and method for controlling concurrent process access of infrastructures comprising tree structures of complex object nodes. The apparatus associated with each complex object node records an accumulate count of each type of lock applied by concurrently running computer processes against each infrastructure complex node.

The patent to Kothuri et al. (U.S. Pat. No. 6,505,205) provides for a system and method for indexing and storing multi-dimensional or multi-attribute data. Data items are recursively sorted in a selected dimension (e.g., the dimension having the greatest variance) and divided until each sub-division fits into a leaf node having a specified fanout. Intermediate nodes and a root node are constructed to complete the index. Each node of the index is stored in a database as a separate object or record and may include a node identifier of the unique, an identifier of a parent and/or a sibling node and an entry for each child of the node, which may be data items or other nodes. Each record entry for a child includes an associated bounding area encompassing descendant data items. Another database table or module may store information about the index, such as the dimensionality of the data, the index fanout and an identifier of a root of the index.

The patent application publication to Keating (2002/0052895) discloses a system and method for generalizing the content in a formatted document, wherein the system and method permit a group with multiple elements to be processed rapidly even if the number of elements in the group changes over time.

Whatever the precise merits, features, and advantages of the above cited references, none of them achieves or fulfills the purposes of the present invention.

SUMMARY OF INVENTION

The present invention provides for an extensible identification system for nodes in a hierarchy, wherein each node is assigned a concatenation of decimal based values. The identification value uniquely identifies the node, provides an order for the node, and identifies its parent, child, and sibling relationships with other nodes. Also, the IDs assigned can be encoded to be byte comparable. Furthermore, the ID's assigned to nodes need not be modified when changes (adding/deleting a child node or a subtree of nodes) are made in the hierarchy. Additionally, in the event of such a change, the order and relationships between the parent, child, and sibling nodes are retained.

The present invention provides for a robust method for updating a computer-stored hierarchical structure of nodes via a node identification technique, wherein the method comprises the steps of: (a) receiving an instruction to insert a new node at an insertion point in a computer-stored hierarchical structure; (b) identifying one of, or a combination of the following: a left node ID value closest to the left of the insertion point or a closest right node ID value closest to the right of the insertion point; (c) calculating a new ID value via any of the following steps: concatenating the left node ID value with one or more high key values and a positive value, decreasing last digit of the right node ID value, increasing last digit of left node ID value, decreasing last digit of the right node ID value and concatenating a positive value, or concatenating the left node ID value with one or more zeros and a positive value, wherein the calculated value is greater than ID values of nodes to the left of the insertion point and less than ID values of nodes to the right of the insertion point; and (d) updating the computer-stored hierarchical structure by inserting the new node in the hierarchy and associating the new node with the calculated ID value. As a result of such an implementation, the order, node ID values, and relationships between parent, child, and siblings in the hierarchical structure of nodes remain unchanged with the insertion of new nodes.

The present invention provides a way for assigning IDs to nodes in a hierarchy and provides many advantages, some of which include: (a) the IDs provide a way of ordering nodes in a hierarchy; (b) the IDs describe a node's parent, child, and sibling relationships; (c) the IDs can be encoded such that they are byte comparable; (d) the IDs can be assigned to newly inserted nodes, anywhere in the hierarchy, and still maintain these properties; and (e) the IDs, once assigned, do not have to change even with changes to the hierarchy.

Figure 1:
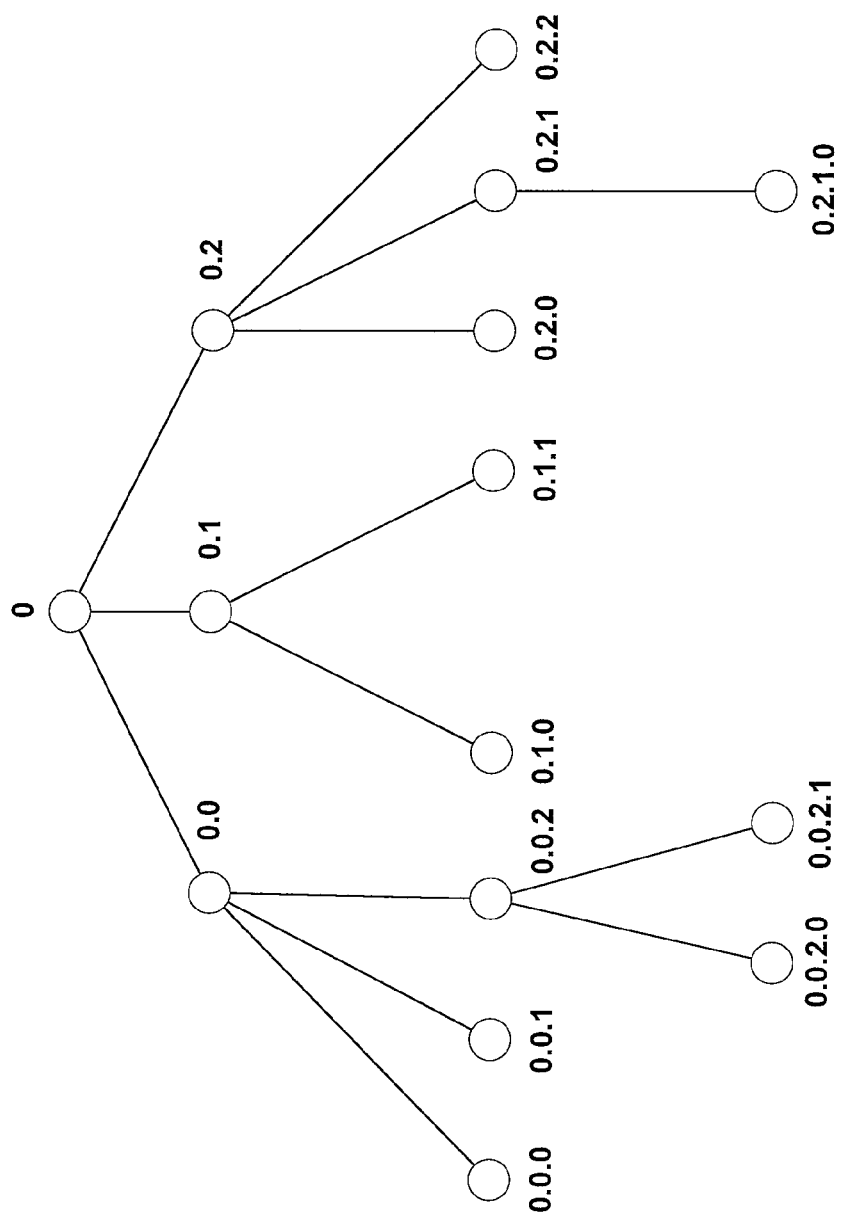
FIG. 1 illustrates a hierarchical node structure representative of the prior art.

DESCRIPTION OF THE PREFERRED
EMBODIMENTS

While this invention is illustrated and described in a preferred embodiment, the invention may be implemented in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2A:
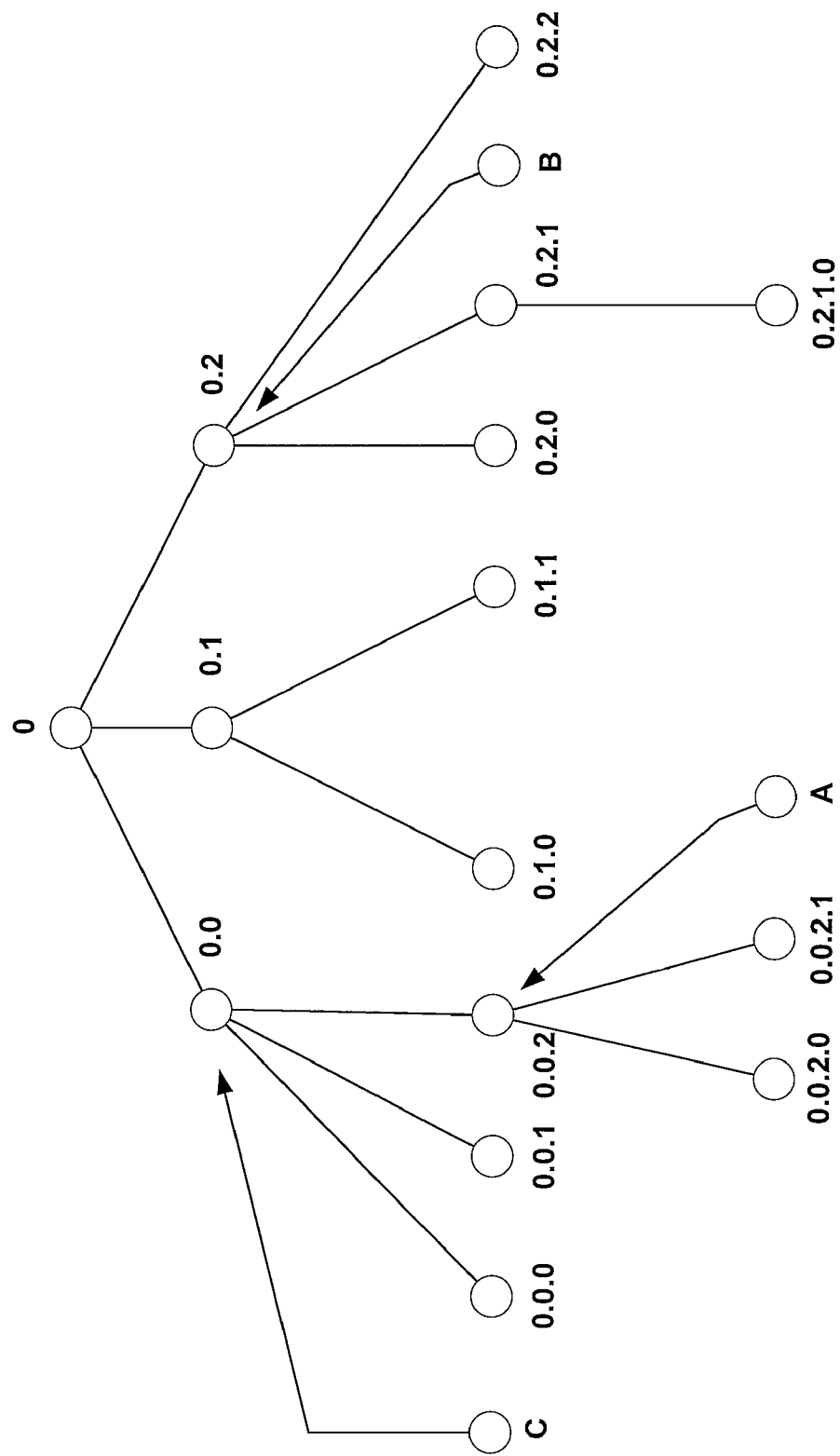
FIGS. 2*a* and 2*b* collectively illustrate the concept of renumbering when nodes A, B, and C are added to an existing hierarchical node structure.
Figure 2B:
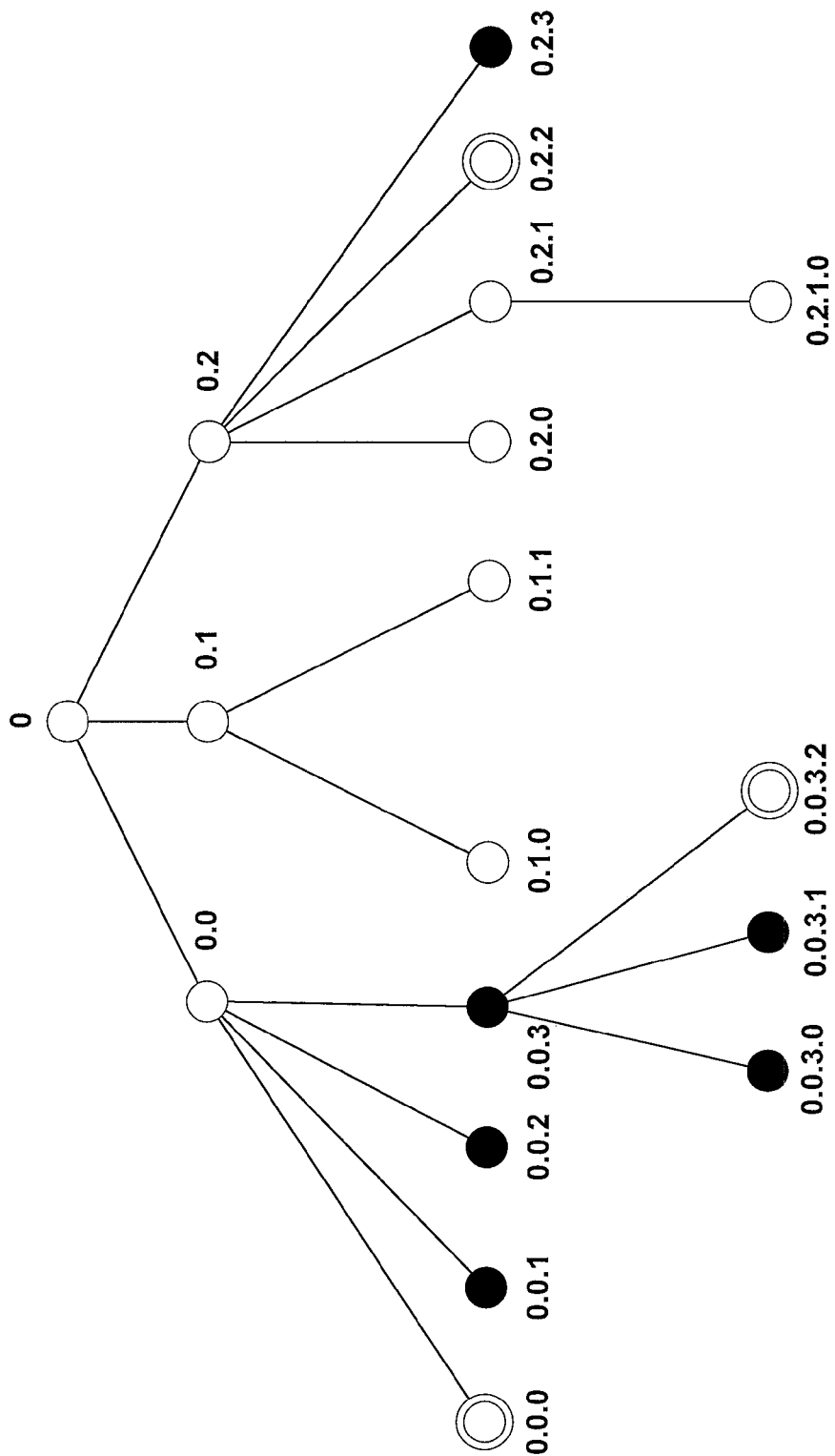
Figure 3:
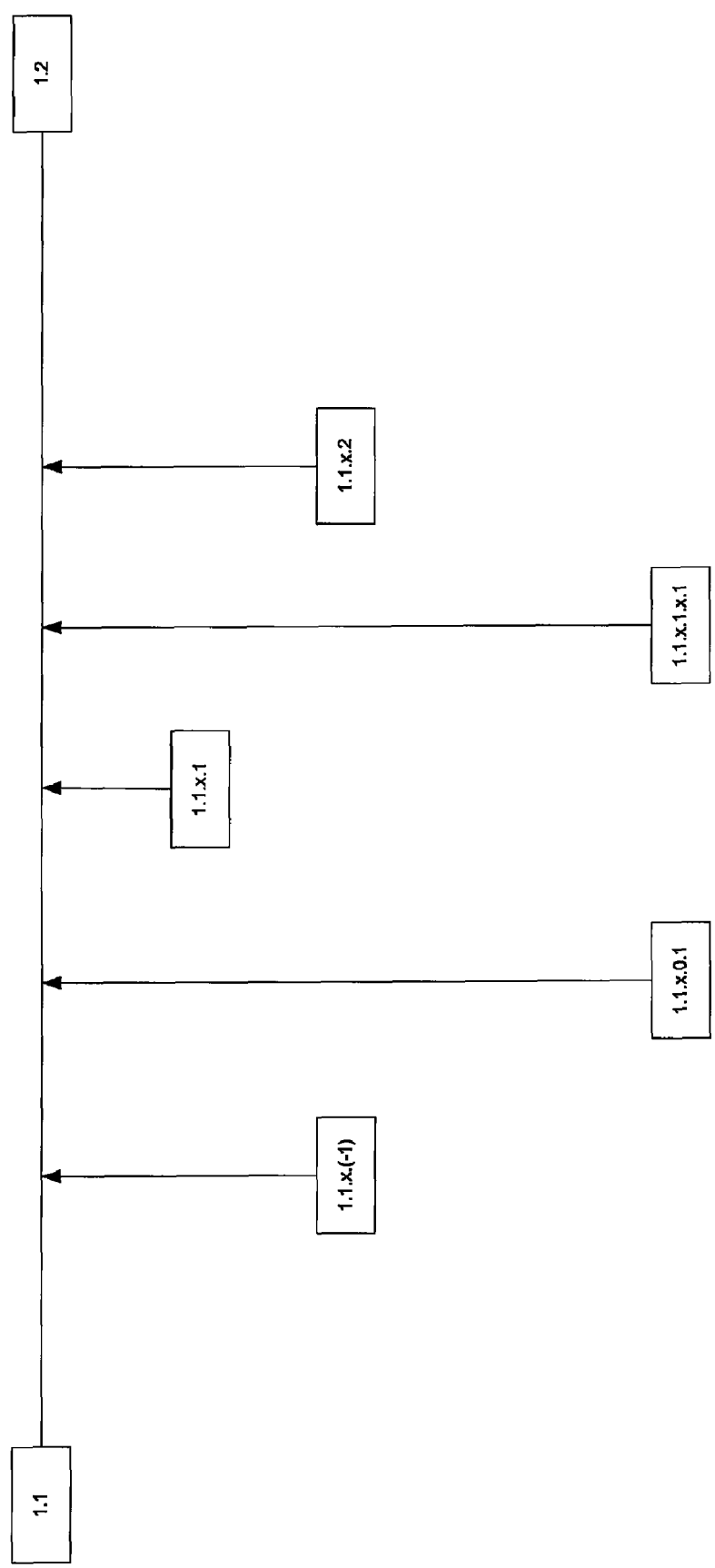
FIGS. 3 through 8 collectively illustrate various embodiments of the present invention's technique to avoid re-numbering of existing node IDs.

The present invention provides for a method for inserting nodes in a hierarchically ordered node structure without modifying existing node IDs. FIG. 3 illustrates one embodiment of the present invention for avoiding the re-numbering of IDs. In this embodiment, 1 (instead of 0 as in FIGS. 1 and 2*a-b*) starts the count on every level. The method is triggered when an instruction is received to insert a new node at an insertion point in said computer-stored hierarchical structure. If a node is inserted in between two siblings, the digits of the left sibling are concatenated with a high key value 'x' and a 1. In one instance, to insert a node in between left node ID 1.1 and right node ID 1.2, digits of the left sibling, 1.1, are concatenated with x and 1 to give 1.1.x.1. The prefix 1.1.x guarantees that any node in the subtree of the left sibling 1.1 is lower in value. The positive 1 after the high key 'x' starts off a count. To insert another node in between left node ID 1.1.x.1 and right node ID 1.2, the last digit of the left node ID is increased, giving the new node an ID value of 1.1.x.2. To insert another node in between left node ID 1.1 and right node ID 1.1.x.1, the last digit of the right node ID is decreased, giving the new node an ID value of 1.1.x.−1.

Analogous to the high key value 'x', a low key value '0' is used to extend the count in the opposite direction. For example, to insert a node in between 1.1.x.(−1) and 1.1.x.1, an ID value of 1.1.x.0.1 is used. Negative numbers are used when counting in descending order to avoid using the low key '0'. The level of a node can be determined from the ID by subtracting the number of x's multiplied by 2, and the number of 0's from the total number of digits. For example, 1.1.x.1 belongs to level 2.

Figure 4:
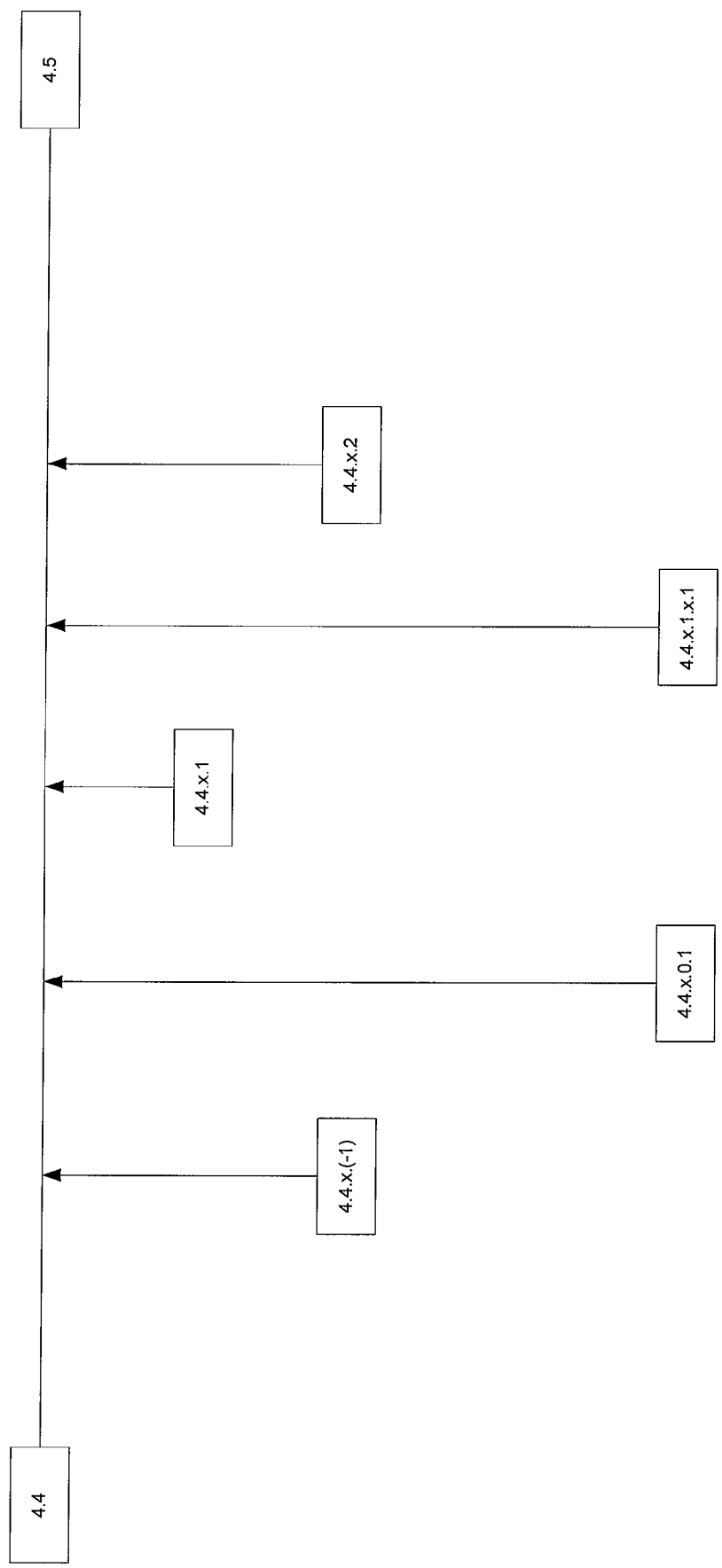

FIG. 4 illustrates another example of the above-mentioned embodiment wherein nodes are inserted between a node with an ID value of 4.4 and a node with an ID value of 4.5. As in FIG. 3, to insert a node between left node ID 4.4 and right node ID 4.5, digits of the left sibling, 4.4, are concatenated with x and 1 to give 4.4.x.1. Similarly, to insert a node in between 4.4.x.(−1) and 4.4.x.1, an ID value of 4.4.x.0.1 is used. To insert another node in between left node ID 4.4.x.1 and right node ID 4.5, the last digit of the left node ID is increased, giving the new node an ID value of 4.4.x.2. To insert another node in between left node ID 4.4 and right node ID 4.4.x.1, the last digit of the right node ID is decreased, giving the new node an ID value of 4.4.x.−1. Tables 1 and 2 show an example of how the IDs of FIG. 4 are encoded. It should be noted that the encoding shown is byte comparable.

TABLE 1

| Binary Code | Symbol |
| --- | --- |
| 0001 0111 1111 | −9 |
| 0001 1000 | −8 |
| 0001 1110 | −2 |
| 0001 1111 | −1 |
| 0010 | 0 |
| 0011 | 1 |
| 0100 | 2 |
| 0101 | 3 |
| 0110 | 4 |
| 0111 | 5 |
| 1000 0000 | $5 + 2^0$ |
| 1001 1111 | $5 + 2^5$ |
| 1010 1111 1111 | $5 + 2^5 + 2^8$ |
| 1011 0111 1111 1111 | $.. + 2^8 + 2^{11}$ |
| 1111 | x |
| 0000 | Reserved |
| 0001 | Negative Sign |

TABLE 2

| Symbol | Binary Code |
| --- | --- |
| 4.4 | 0110 0110 |
| 4.4.x.(−1) | 0110 0110 1111 0001 1111 |
| 4.4.x.0.1 | 0110 0110 1111 0010 0011 |
| 4.4.x.1 | 0110 0110 1111 0011 |
| 4.4.x.1.x.1 | 0110 0110 1111 0011 1111 0011 |
| 4.4.x.2 | 0110 0110 1111 0100 |
| 4.5 | 0110 0111 |

Figure 5:
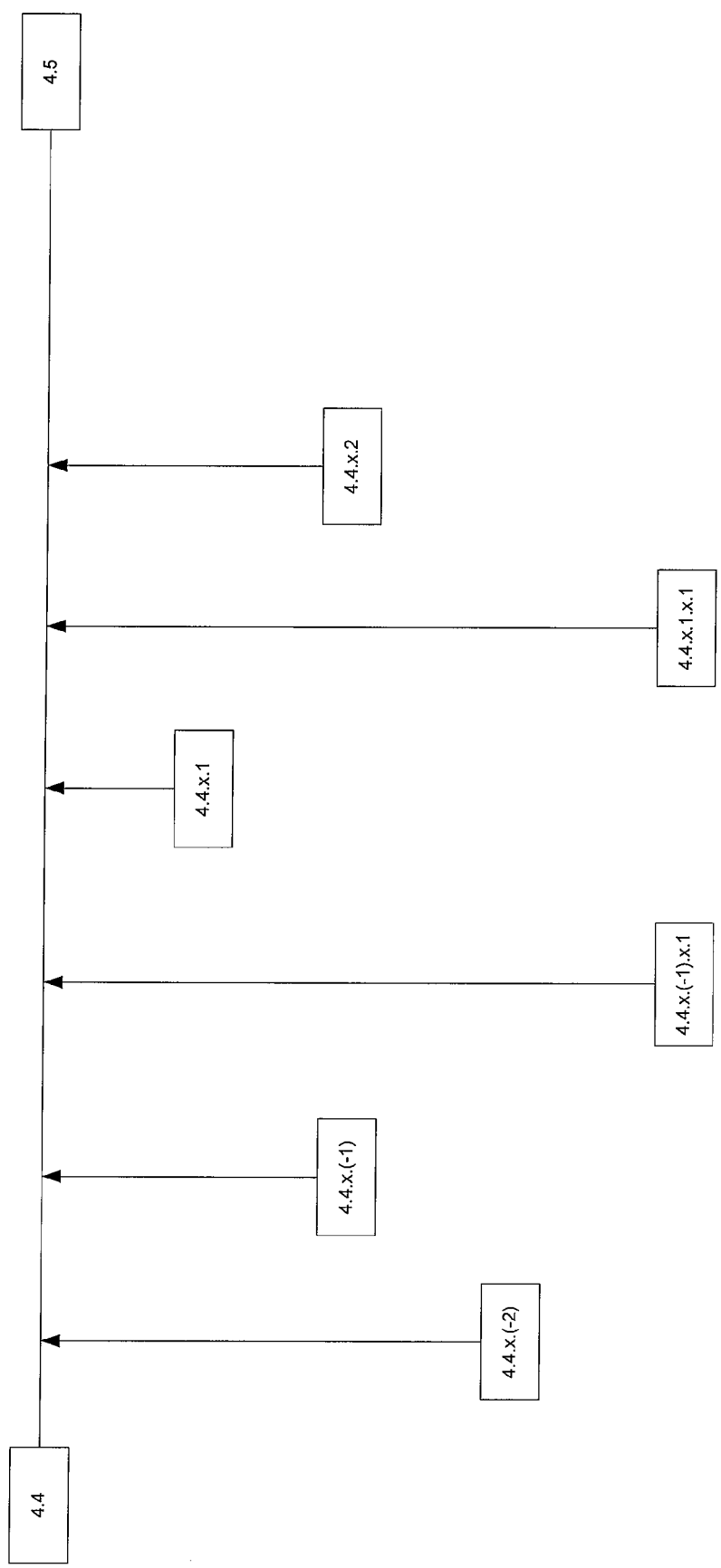

FIG. 5 illustrates a variation of the technique of FIGS. 3-4. The variation involves avoiding using 0's and instead using x's to extend the series. For example, 4.4.x.(−1).x.1 is used to follow 4.4.x.(−1), instead of 4.4.x.0.1. This leaves both x and 0 free to be used as positive infinity and negative infinity, which can be used as special purpose high/low key values as shown in Tables 3 and 4.

TABLE 3

| Binary Code | Symbol |
| --- | --- |
| 0001 0111 1111 | −9 |
| 0001 1000 | −8 |
| 0001 1110 | −2 |
| 0001 1111 | −1 |
| 0010 | 0 |
| 0011 | 1 |
| 0100 | 2 |

TABLE 3-continued

| Binary Code | Symbol |
|---|---|
| 0101 | 3 |
| 0110 | 4 |
| 0111 | 5 |
| 1000 0000 | $5 + 2^0$ |
| 1001 1111 | $5 + 2^5$ |
| 1010 1111 1111 | $5 + 2^5 + 2^8$ |
| 1011 0111 1111 1111 | $.. + 2^8 + 2^{11}$ |
| 1111 | +x Positive Infinity |
| 0000 | −x Negative Infinity |
| 0001 | Negative Sign |

TABLE 4

| Symbol | Binary Code |
|---|---|
| 4.4 | 0110 0110 |
| 4.4.x.(−2) | 0110 0110 1111 0001 1110 |
| 4.4.x.(−1) | 0110 0110 1111 0001 1111 |
| 4.4.x4(−1).x.1 | 0110 0110 1111 0001 1111 1111 0011 |
| 4.4.x.1 | 0110 0110 1111 0011 |
| 4.4.x.1.x.1 | 0110 0110 1111 0011 1111 0011 |
| 4.4.x.2 | 0110 0110 1111 0100 |
| 4.5 | 0110 0110 0111 |

Figure 6:
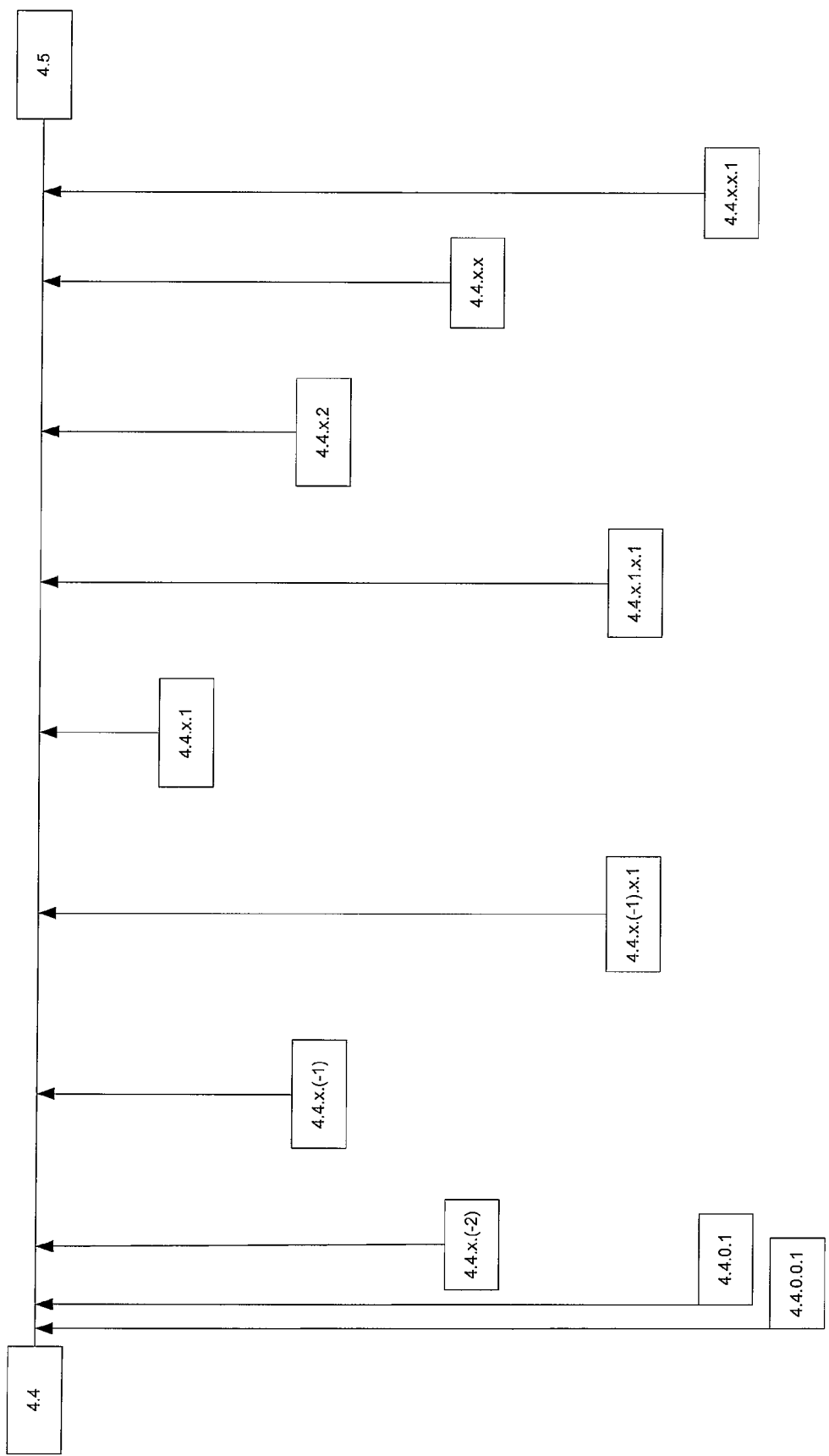

To compute a number that is higher than any of 4.5's left sibling, or any of its descendant, the last number is decremented and concatenated with x.x resulting in 4.4.x.x This number is higher than any of 4.5's left sibling, or any of the siblings descendant. This property of the encoding (i.e., the fact that a number such as this can be computed) is important when doing a sort. This aspect is show in FIG. 6. For example, a sort instruction can be issued to return all ID values between 4.4 and 4.4.x.x for identifying all of 4.5's previous siblings and any of its descendants.

Same can be said for 4.4.0.1. Children and descendants of 4.4 can be identified by issuing a sort instruction to return all ID values between higher than 4.4.0.1, but not greater than 4.4.x.x.

Another property about this encoding is that these numbers can be compute to use as keys for searching. For example, one need not have prior knowledge of whether 4.5's previous sibling is 4.3, 4.2, or 4.4 (since during deletes, nodes 4.4, 4.3, etc., could be removed). Such numbers can be computed and used as special keys to find the existence of sibling/parent/children nodes.

Figure 7:
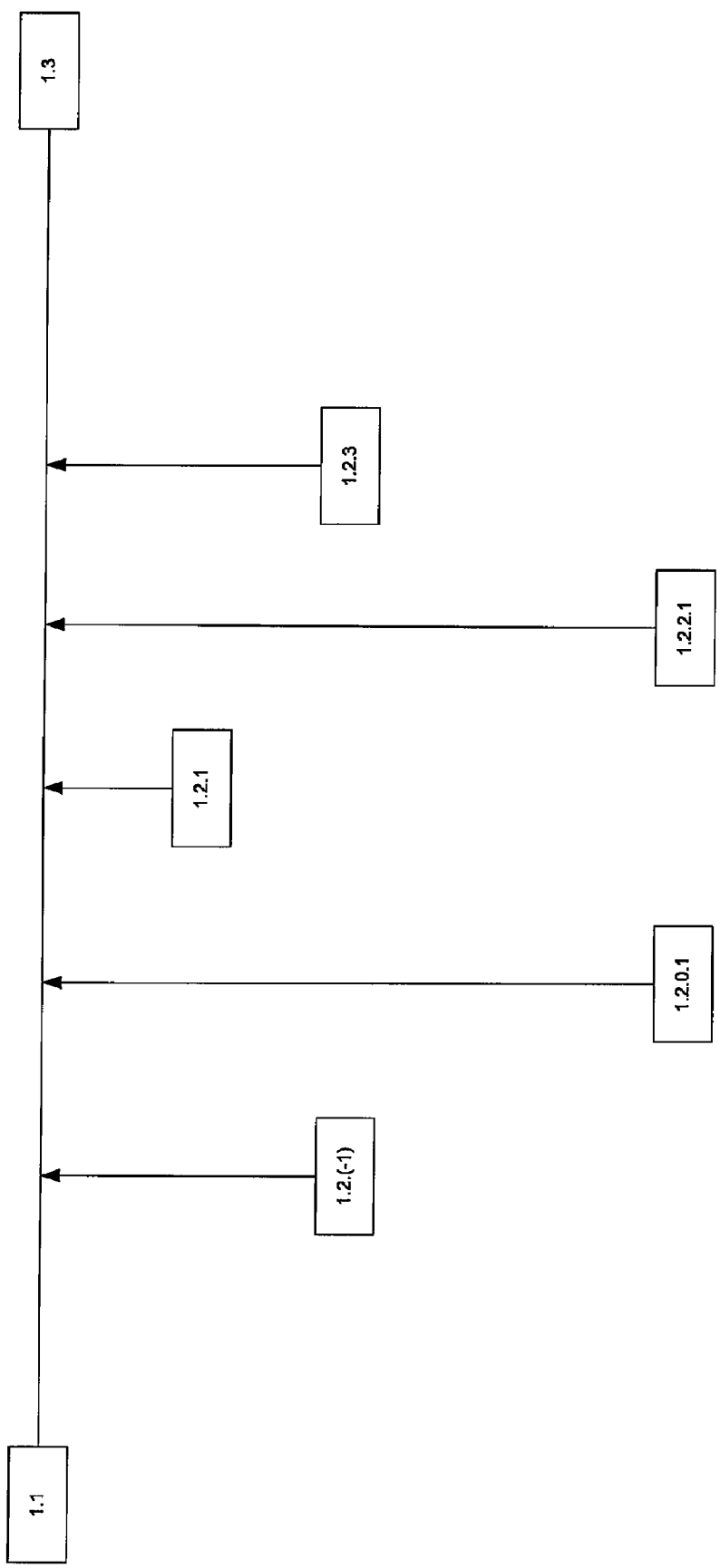

FIG. 7 illustrates another embodiment wherein, in lieu of using a high key value 'x', a gap is introduced in the count between nodes and the gap value is used as the high key value. For example, sibling nodes are assigned 1.1, 1.3, and 1.5, and so on. To insert a node in between left node ID 1.1 and right node ID 1.3, the last digit of the right node ID is decreased and concatenated with 1, giving the newly inserted node an ID value of 1.2.1. The prefix 1.2 guarantees that any node in the subtree of the left sibling 1.1 is lower in value. To insert another node between left node ID 1.2.1 and right node ID 1.3, the last digit of the left node ID is increased, giving the newly added node an ID value of 1.2.3. To insert a node in between nodes with ID values of 1.2.1 and 1.2.3, an ID value of 1.2.2.1 is used. The 0 digit and negative numbers are used in the same way as in FIG. 3. To insert a new node between left node ID 1.1 and right node ID 1.2.0.1, the last digit of the right node ID is decreased, giving the newly added node an ID value of 1.2.−1. The level of an ID can be determined by counting the number of odd digits in the ID. For example, the ID 1.2.2.1 belongs to level 2.

Figure 8:
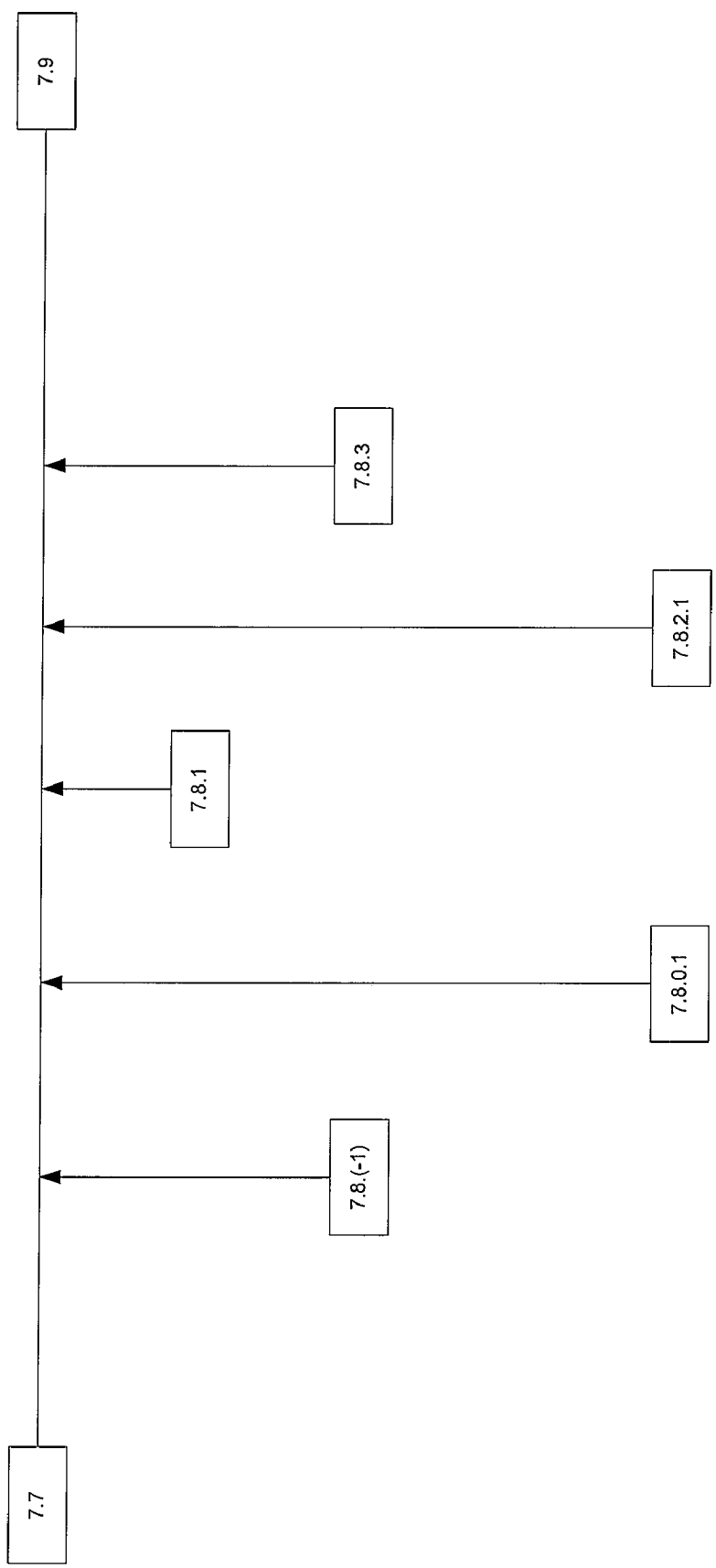

FIG. 8 illustrates another example of the above-mentioned embodiment wherein nodes are inserted between a node with an ID value of 7.7 and a node with an ID value of 7.9. As in FIG. 5, to insert a node in between nodes with ID values of 7.7 and 7.9, an ID value of 7.8.1 is used. Similarly, to insert another node after 7.8.1, an ID value of 7.8.3 is used and to insert a node in between nodes with ID values of 7.8.1 and 7.8.3, an ID value of 7.8.2.1 is used. Tables 5 and 6 show an example of how the IDs of FIG. 8 are encoded. It should be noted that the encoding shown is byte comparable.

TABLE 5

| Binary Code | Symbol |
|---|---|
| 0001 0111 1111 | −9 |
| 0001 1000 | −8 |
| 0001 1110 | −2 |
| 0001 1111 | −1 |
| 0010 | 0 |
| 0011 | 1 |
| 0100 | 2 |
| 0101 | 3 |
| 0110 | 4 |
| 0111 | 5 |
| 1000 0000 | $5 + 2^0$ |
| 1011 1111 | $5 + 2^6$ |
| 1101 1111 1111 | $5 + 2^6 + 2^9$ |
| 1110 1111 1111 1111 | $.. + 2^9 + 2^{12}$ |
| 0000 | Reserved |
| 0001 | Negative Sign |

TABLE 6

| Binary Code | Symbol |
|---|---|
| 7.7 | 1000 0001 1000 0001 |
| 7.8.(−1) | 1000 0001 1000 0010 0001 1111 |
| 7.8.0.1 | 1000 0001 1000 0010 0010 0011 |
| 7.8.1 | 1000 0001 1000 0010 0011 |
| 7.8.2.1 | 1000 0001 1000 0010 0100 0011 |
| 7.8.3 | 1000 0001 1000 0010 0101 |
| 7.9 | 1000 0001 1000 0011 |

Some of the benefits of the present invention are: (a) nodes in a hierarchy are identifiable by a unique ID; (b) each ID describes whether a node is a parent, a child or a sibling of another; (c) the IDs provide a total ordering; (d) the IDs can be encoded such that they are byte comparable; (e) no matter where nodes are inserted, the newly encoded IDs are still byte comparable and maintains order; and (f) existing IDs in a hierarchy can stay the same even with changes (insertions or deletions) made to the hierarchy.

Additionally, the present invention provides for an article of manufacture comprising computer readable program code contained within implementing one or more modules updating a computer-stored hierarchical structure of nodes via a node identification technique, wherein such an update allows for retaining the properties and parent/child relationships of the hierarchical structure without renumbering existing node ID values associated with the hierarchical structure. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) receiving an instruction to insert a new node at an insertion point in a computer-stored hierarchical structure; (b) identifying one of, or a combination of the following: a left node ID value closest to the left of the insertion point or a closest right node ID value closest to the right of the insertion point; (c) calculating a new ID value via any of the following steps: concatenating the left node ID value with one or more high key values and a positive value, decreasing last digit of the right node ID value, increasing last digit of left node ID value, decreasing last digit of the right node ID value and concatenating a positive value, or concatenating the left node ID value with one or more zeros and a positive value, the calculated value greater than ID values of nodes to the left of the insertion point and less than ID values of nodes to the right of the insertion point; and (d) updating the computer-stored hierarchical structure by inserting the new node wherein order, node ID values, and relationships between parent, child, and siblings in the hierarchical structure of nodes remain unchanged with the insertion of new node.

CONCLUSION

A system and method has been shown in the above embodiments for the effective implementation of an extensible decimal identification system for ordered nodes. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A robust computer-based method for updating a computer-stored hierarchical structure of nodes via a node identification technique, said nodes of said hierarchical structure stored as encoded values in a computer storage, said update retaining properties and parent/child relationships of said hierarchical structure without renumbering existing node ID values associated with said hierarchical structure, said method comprising the steps of:
   (a) receiving an instruction to insert a new node at an insertion point in said computer-stored hierarchical structure;
   (b) identifying one of, or a combination of the following: a left node ID value closest to the left of said insertion point or a closest right node ID value closest to the right of said insertion point;
   (c) calculating a new ID value based upon node ID value(s) identified in (b), said calculated value greater than ID values of nodes to the left of said insertion point and less than ID values of nodes to the right of said insertion point, said new ID value based upon a low/high key value, said high key value representing a highest encodable value and said low key value representing a lowest encodable value; and
   (d) encoding said calculated new ID value and updating said computer storage storing said nodes of said hierarchical structure with said encoded value, wherein order, node ID values, and relationships between parent, child, and siblings in said hierarchical structure of nodes stored in said storage remain unchanged with said insertion of new node.

2. A computer-based method as per claim 1, wherein said new ID value is calculated via any of the following steps: concatenating said left node ID value with one or more high key values and a positive value or concatenating said left node ID value with one or more low key values and a positive value.

3. A computer-based method as per claim 1, wherein a digit in said calculated ID value has a negative value.

4. A computer-based method as per claim 1, wherein said encoding is binary encoding and said highest encodable value is 1111 and said lowest encodable value is 0000.

5. A computer-based method as per claim 1, wherein said ID values are encoded and are byte comparable.

6. A computer-based method as per claim 1, wherein said nodes are associated with a mark-up language based document.

7. A computer-based method as per claim 6, wherein said mark-up based language is XML.

8. A computer-based method as per claim 1, wherein said method is implemented in conjunction with a relational database.

9. An article of manufacture comprising a computer usable medium having computer readable program code embodied therein which updates a computer-stored hierarchical structure of nodes via a node identification technique, said nodes of said hierarchical structure stored as encoded values in a computer storage, said update retaining properties and parent/child relationships of said hierarchical structure without renumbering existing node ID values associated with said hierarchical structure, said medium comprising:
   (a) computer readable program code aiding in receiving an instruction to insert a new node at an insertion point in said computer-stored hierarchical structure;
   (b) computer readable program code identifying one of, or a combination of the following: a left node ID value closest to the left of said insertion point or a closest right node ID value closest to the right of said insertion point;
   (c) computer readable program code calculating a new ID value based upon node ID value(s) identified in (b), said calculated value greater than ID values of nodes to the left of said insertion point and less than ID values of nodes to the right of said insertion point, said new ID value based upon a low/high key value, said high key value representing a highest encodable value and said low key value representing a lowest encodable value; and
   (d) computer readable program code encoding said calculated new ID value and updating said computer storage with said encoded value, wherein order, node ID values, and relationships between parent, child, and siblings in said hierarchical structure of nodes stored in said storage remain unchanged with said insertion of new node.

10. An article of manufacture as per claim 9, wherein said new ID value is calculated via any of the following steps: concatenating said left node ID value with one or more high key values and a positive value or concatenating said left node ID value with one or more zeros and a positive value.

11. An article of manufacture as per claim 9, wherein said ID values are encoded and are byte comparable.

12. An article of manufacture as per claim 9, wherein said nodes are associated with a mark-up language based document.

13. An article of manufacture as per claim 12, wherein said mark-up based language is XML.

14. An article of manufacture as per claim 9, wherein said medium works in conjunction with a relational database.

15. An article of manufacture as per claim 9, wherein said encoding is binary encoding and said highest encodable value is 1111 and said lowest encodable value is 0000.

16. An article of manufacture as per claim 9, wherein a digit in said calculated ID value has a negative value.

17. A computer-based method for updating a computer-stored hierarchical structure of nodes without renumbering existing node ID values associated with said hierarchical structure, said nodes of said hierarchical structure stored as binary encoded values in a computer storage, said method comprising the steps of:
  (a) receiving an instruction to insert a new node at an insertion point in said computer-stored hierarchical structure;
  (b) identifying one of, or a combination of the following: a left node ID value closest to the left of said insertion point or a closest right node ID value closest to the right of said insertion point;
  (c) calculating a new ID value for node to be inserted based upon a low key value 0 or a high key value x, said high key value representing a highest binary encodable value and said low key value representing a lowest binary encodable value, said calculation performed via one of the follows ways: concatenating said left node ID value with one or more high key values and a positive value or concatenating said left node ID value with one or more low key values and a positive value; and
  (d) encoding, via binary encoding, said calculated new ID value and updating said computer storage with said binary encoded value, wherein order, node ID values, and relationships between parent, child, and siblings in said hierarchical structure of nodes stored in said storage remain unchanged with said insertion of new node.

18. A computer-based method as per claim 17, wherein a digit in said calculated ID value has a negative value.

19. A computer-based method as per claim 17, wherein said ID values are encoded and are byte comparable.

20. A computer-based method as per claim 17, wherein said nodes are associated with a mark-up language based document.

21. A computer-based method as per claim 20, wherein said mark-up based language is XML.

22. A computer-based method as per claim 17, wherein said method is implemented in conjunction with a relational database.

* * * * *